United States Patent
Maida, Jr.

(10) Patent No.: US 7,400,803 B2
(45) Date of Patent: Jul. 15, 2008

(54) METHOD AND APPARATUS FOR PROVIDING A HYDROGEN DIFFUSION BARRIER FOR FIBER OPTIC CABLES USED IN HOSTILE ENVIRONMENTS

(75) Inventor: John L. Maida, Jr., Houston, TX (US)

(73) Assignee: Welldynamics, B.V., Leiderdorp (NL)

( * ) Notice: Subject to any disclaimer, the term of this patent is extended or adjusted under 35 U.S.C. 154(b) by 354 days.

(21) Appl. No.: 11/090,656

(22) Filed: Mar. 25, 2005

(65) Prior Publication Data

US 2006/0215974 A1    Sep. 28, 2006

(51) Int. Cl.
*G02B 6/44* (2006.01)

(52) U.S. Cl. .................. 385/100; 385/102; 385/123; 385/127; 385/128; 385/141

(58) Field of Classification Search .......... 385/100, 385/102, 104, 109, 111, 123, 127, 128, 141
See application file for complete search history.

(56) References Cited

U.S. PATENT DOCUMENTS

| | | | |
|---|---|---|---|
| 4,696,543 A | 9/1987 | Pitt et al. | 350/96.23 |
| 4,767,182 A | 8/1988 | Parfree et al. | 385/100 |
| 5,140,664 A | 8/1992 | Bosisio et al. | 385/109 |
| 5,857,255 A | 1/1999 | Wichmann | 29/458 |
| 5,892,176 A | 4/1999 | Findlay et al. | 174/115 |
| 5,896,482 A | 4/1999 | Blee et al. | 385/107 |
| 6,116,578 A | 9/2000 | Pruett | 252/134.4 |
| 6,130,981 A | 10/2000 | Nelson et al. | 385/128 |
| 6,220,059 B1 | 4/2001 | Klein et al. | 65/394 |
| 6,258,404 B1 | 7/2001 | Morgand et al. | 427/163.2 |
| 6,343,173 B2 | 1/2002 | Hordvik et al. | 385/102 |
| 6,404,961 B1 | 6/2002 | Bonja et al. | 385/109 |
| 6,438,999 B1 | 8/2002 | Antos et al. | 65/399 |
| 6,475,620 B1 | 11/2002 | Ruello et al. | 428/392 |
| 6,496,625 B1 | 12/2002 | Falkowich et al. | 385/100 |
| 6,557,630 B2 | 5/2003 | Harkins et al. | 166/250.01 |
| 6,597,850 B2 | 7/2003 | Andrieu et al. | 385/128 |
| 6,614,970 B2 | 9/2003 | Bonicel | 385/109 |
| 6,685,361 B1 | 2/2004 | Rubino et al. | 385/58 |

(Continued)

FOREIGN PATENT DOCUMENTS

EP    0 163 401 A2    4/1985

(Continued)

OTHER PUBLICATIONS

Advertisement, "Downhole Optical Cable," Weatherford International Ltd., 2 pages © 2003.

(Continued)

*Primary Examiner*—Brian M Healy
(74) *Attorney, Agent, or Firm*—Smith IP Services P.C.

(57) ABSTRACT

A fiber optic conduit for use in a hostile environment includes an axial tube. The axial tube comprises a corrosion resistant material and is operable to receive one or more optical fibers. The fiber optic conduit further includes a hydrogen barrier shell that is disposed in contact with the axial tube. The hydrogen barrier shell comprises a material that is capable of reducing hydrogen permeation through the fiber optic conduit and has a thickness of at least approximately one-thousandth of an inch.

19 Claims, 2 Drawing Sheets

U.S. PATENT DOCUMENTS

| | | | |
|---|---|---|---|
| 6,690,866 B2 | 2/2004 | Bonja et al. | 385/109 |
| 6,751,556 B2 | 6/2004 | Schroeder et al. | 702/6 |
| 6,907,170 B1* | 6/2005 | Maida, Jr. | 385/100 |
| 2004/0258371 A1 | 12/2004 | Kuczma et al. | 385/100 |
| 2006/0018611 A1* | 1/2006 | Maida, Jr. | 385/102 |
| 2006/0215974 A1* | 9/2006 | Maida, Jr. | 385/107 |

FOREIGN PATENT DOCUMENTS

| | | |
|---|---|---|
| GB | 2402231 A | 12/2004 |
| WO | WO 96/15466 | 5/1996 |
| WO | WO 00/05612 | 2/2000 |
| WO | WO 2006/019476 A2 | 2/2006 |

OTHER PUBLICATIONS

AFL Telecommunications, "CentraCore OPT-GW," Fiber Optic Cable white paper, a Fujikura Business, www.AFLtele.com, 1 page © 2002.

PCT/US2006/013810, Notification of Transmittal of the International Search Report and the Written Opinion of the International Searching Authority, or the Declaration, 10 pages, Mailed Aug. 10, 2006.

PCT/US2006/005593, Notification of Transmittal of the International Search Report and the Written Opinion of the International Searching Authority, or the Declaration, 14 pages, Mailed Nov. 10, 2006.

PCT, International Searching Authority, 5 pages, Mailed Dec. 22, 2005.

PCT/IB/326, International Preliminary Report on Patentability and Written Opinion issued for PCT/US2006/005593 dated Oct. 4, 2007 (9 pages).

* cited by examiner

METHOD AND APPARATUS FOR PROVIDING A HYDROGEN DIFFUSION BARRIER FOR FIBER OPTIC CABLES USED IN HOSTILE ENVIRONMENTS

TECHNICAL FIELD OF THE INVENTION

This invention relates in general to fiber optic cables, and more particularly, to a system and method for reducing the effects of hydrogen diffusion and/or radiation degradation in fiber optic cables used in hostile environments.

BACKGROUND

Fiber optic cables used in hostile environments, such as those found "under-sea" in telecommunications systems and/or "down-hole" in oil and gas wells, provide a critical link between sensors within the hostile environment and instrumentation outside the environment. In some oil and gas applications, the environment in a down-hole well can include relatively high temperatures, high vibration, corrosive chemistries, and/or the presence of hydrogen. In other oil and gas applications, the environment in a down-hole well can also include X-rays, gamma-rays, or other forms a radiation. Using conventional fiber optic cables in down-hole environments having relatively high temperatures, the presence of hydrogen, and/or the presence of radiation often results in degradation of the fiber optic cable. In most cases, degradation of the fiber optic cable can reduce the normal life expectancy of the optical fibers within the cable. Moreover, degradation of the fiber optic cable typically reduces the optical performance of the optical fibers.

SUMMARY OF EXAMPLE EMBODIMENTS

In one embodiment, a fiber optic conduit for use in a hostile environment comprises an axial tube. The axial tube comprises a corrosion resistant material and is operable to receive one or more optical fibers. The fiber optic conduit further comprises a hydrogen barrier shell that is disposed in contact with the axial tube. The hydrogen barrier shell comprises a material that is capable of reducing hydrogen permeation through the fiber optic conduit and a thickness of at least approximately one-thousandth of an inch.

In another embodiment, a fiber optic conduit for use in a hostile environment comprises an axial tube. The axial tube comprises a corrosion resistant material and is capable of receiving one or more optical fibers. The fiber optic conduit further comprises a hydrogen barrier shell. The hydrogen barrier shell comprises a material that is capable of reducing hydrogen permeation through the fiber optic conduit and is capable of forming a cylindrical covering substantially about a surface of the axial tube. In one particular embodiment, at least a portion of the hydrogen barrier shell is in contact with and adheres to at least a portion of the axial tube through an interference fit.

Depending on the specific features implemented, particular embodiments of the present invention may exhibit some, none, or all of the following technical advantages. Various embodiments may be capable of reducing and/or slowing the deleterious effects of hydrogen and/or radiation on fiber optic cables. Some embodiments may be capable of generating a relatively robust hydrogen and/or radiation barrier within a fiber optic conduit that is capable of receiving one or more optical fibers.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION OF EXAMPLE EMBODIMENTS

Figure 1A:
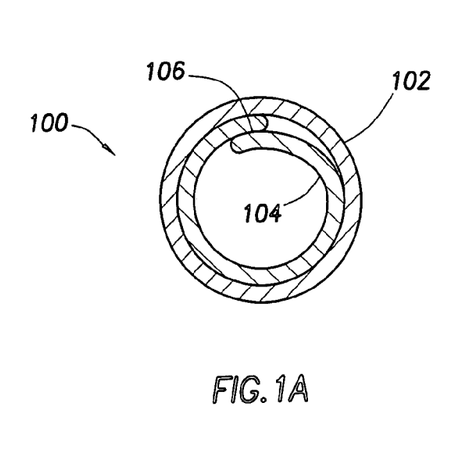
FIGS. 1A through 1C are cross-sectional views showing one example of a method of forming one embodiment of a hydrogen and/or radiation hindering fiber optic conduit for use in a hostile environment.
Figure 1B:
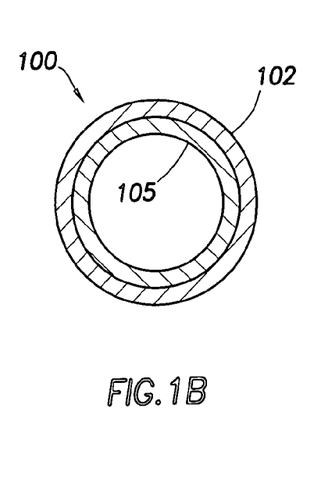
Figure 1C:
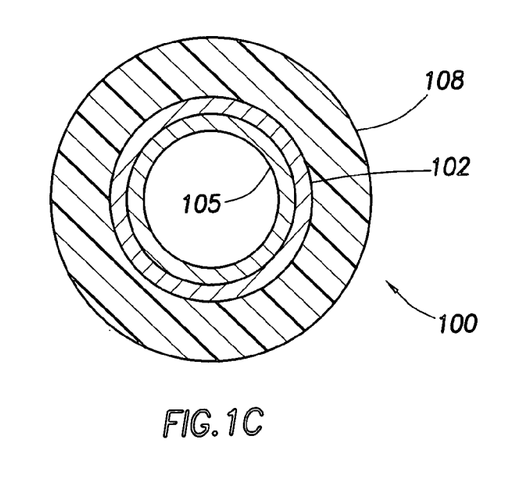

FIGS. 1A through 1C are cross-sectional views showing one example of a method of forming one embodiment of a hydrogen and/or radiation hindering fiber optic conduit 100 for use in a hostile environment. Particular examples and dimensions specified throughout this document are intended for exemplary purposes only, and are not intended to limit the scope of the present disclosure. Moreover, FIGS. 1A through 1C, FIGS. 2A through 2C, FIGS. 3A through 3C, and FIG. 4 are not intended to be to scale.

FIG. 1A shows a cross-sectional view of a fiber optic conduit 100 after formation of an axial tube 102 and an inner barrier layer 104 inwardly from axial tube 102. In this particular embodiment, axial tube 102 operates as a hydrostatic pressure boundary for fiber optic conduit 100. That is, axial tube 102 is capable of withstanding relatively high differential pressures between an environment within axial tube 102 and an environment external to axial tube 102.

Axial tube 102 can comprise, for example, Stainless Steel, Inconel, Incoloy, or any other corrosion resistant metal alloy. In this particular example, axial tube 102 comprises an Inconel A825 tube having a ¼-inch diameter and a 0.035-inch wall thickness. Although this example includes a diameter of ¼-inch and a wall thickness of 0.035-inches, any other selected diameter and wall thickness may be used without departing from the scope of the present disclosure. Moreover, the selected diameter and wall thickness of axial tube 102 may vary over the length of fiber optic conduit 100 depending upon the material selected. In other embodiments, axial tube 102 can comprise a high strength and/or high temperature polymer, such as, for example, a carbon based polymer, a polyimide, or other suitable epoxy or polymer.

Forming axial tube 102 may be effected through any of a variety of manufacturing techniques. In some embodiments, axial tube 102 may be formed by cold rolling a coiled strip stock of a desired material until the ends of the strip stock approximately abut. In that embodiment, the ends of the strip stock can be mechanically joined by, for example, plasma welding, laser welding, or any other appropriate mechanical or chemical joining technique. In this particular embodiment, axial tube 102 is formed such that axial tube 102 is capable of providing a hydrostatic pressure boundary for fiber optic conduit 100.

Inner barrier layer 104 can comprise any material or combination of materials capable of reducing hydrogen and/or radiation permeation through fiber optic conduit 100. For example, inner barrier layer 104 can comprise carbon, silicon, germanium, tin, lead, lead hydride, gold, a eutectic of these materials, or a combination of these or other materials. In some cases, the material for inner barrier layer 104 can be selected based at least in part on a desired operating temperature or property. For example, if conduit 100 is to be used in a hostile environment having an operating temperature of approximately 300° C., then the material for inner barrier layer 104 should be selected such that its melting point is above at least 300° C. In that example, the material for inner barrier layer 104 could comprise, for example, gold, a eutectic of gold, antimony, palladium, silicon oxy-nitride, or any other material capable of reducing hydrogen and/or radiation permeation through fiber optic conduit 100 and capable of withstanding an operating temperature of at least 300° C.

In this particular embodiment, inner barrier layer 104 comprises a malleable material having a thickness that is capable of reducing and/or delaying hydrogen permeation through conduit 100. In some cases, inner barrier layer 104 may also be capable of reducing and/or delaying radiation permeation through conduit 100. In various embodiments, inner barrier layer 104 can comprise a malleable material having a thickness that is capable of withstanding scratches and other surface blemishes without significantly affecting the ability of inner barrier layer 104 to reduce and/or delay hydrogen and/or radiation permeation through conduit 100. In other embodiments, inner barrier layer 104 can comprise a thickness that is capable of withstanding any diffusion of particles between layer 104 and axial tube 102 without significantly affecting the ability of inner barrier layer 104 to reduce and/or delay hydrogen and/or radiation permeation through conduit 100. In some cases, inner barrier layer 104 can comprise a thickness of, for example, at least sixteen microns, at least one-thousandth of an inch, at least five-thousandths of an inch, at least twelve-thousandths of an inch, at least twenty thousandths of an inch, at least fifty thousandths of an inch, or any other selected thickness.

Forming inner barrier layer 104 may be effected through any of a variety of manufacturing techniques. In some embodiments, inner barrier layer 104 may be formed by cold rolling a coiled strip stock of a desired material until the ends of the strip stock approximately abut. In that embodiment, the ends of the strip stock can be mechanically joined by, for example, plasma welding, laser welding, or any other appropriate mechanical or chemical joining technique. In this particular embodiment, inner barrier layer 104 is formed by cold rolling a coiled strip stock of gold such that the ends of inner barrier layer 104 form an overlap 106. In some cases, overlap 106 can comprise, for example, an overlap of approximately one-thousandth of an inch, one-hundredth of an inch, or any other appropriate overlap. In some cases, forming overlap 106 can advantageously allow the formation of a gas tight boundary in a later formed inner barrier shell without a welding process.

In various embodiments, inner barrier layer 104 and axial tube 102 can be formed approximately simultaneously. That is, portions of inner barrier layer 104 can be cold rolled and mechanically joined just before portions axial tube 102 are cold rolled and mechanically joined. In other embodiments, inner barrier layer 104 and axial tube 102 can be formed substantially independently of one another. In those cases, after formation of inner barrier layer 104 and axial tube 102, inner barrier layer 104 can be inserted into axial tube 102. In this particular embodiment, at least a portion of inner barrier layer 104 is cold rolled before the portion of axial tube 102 that covers that portion of the inner barrier layer 104 is cold rolled and mechanically joined.

FIG. 1B shows a cross-sectional view of a fiber optic conduit 100 after formation of an inner barrier shell 105 inwardly from axial tube 102. In this particular embodiment, inner barrier shell 105 operates to reduce and/or delay hydrogen permeation through fiber optic conduit 100. In other embodiments, inner barrier shell 105 may be capable of reducing and/or delaying radiation permeation through conduit 100. As used throughout this document, the term "shell" refers to a layer that creates a cylindrical covering substantially about a material disposed inwardly or outwardly therefrom. In other words, a shell can form a cylindrical covering substantially about an inner or outer surface of, for example, axial tube 102. In this particular embodiment, inner barrier shell 105 forms a cylindrical covering substantially about an inner surface of axial tube 102. Moreover, the term "shell" refers to a cover that substantially provides its own mechanical integrity and is not required to function as a pressure boundary. In contrast, a coating typically relies on an ionic or covalent bond with a substrate to provide its mechanical integrity.

In this particular embodiment, inner barrier shell 105 resides inwardly from and in contact with axial tube 102. That is, at least a portion of an outer surface of inner barrier shell 105 contacts at least a portion of an inner surface of axial tube 102. In this example, the portion of inner barrier shell 105 in contact with axial tube 102 adheres to axial tube 102 through an interference fit. As used throughout this document, the phrase "interference fit" refers to adhesion between mating surfaces that results from tensile and/or compressive forces associated with at least one of the two surfaces. Moreover, an interference fit is one that is substantially free from chemical or mechanical bonding processes. That is, the points at which inner barrier shell 105 adhere to axial tube 102 are substantially free from ionic bonding, covalent bonding, epoxy bonding, brazing and/or welding.

Forming inner barrier shell 105 may be effected through any of a variety of manufacturing processes. In various embodiments, inner barrier shell 105 may be formed, for example, using an expandable process or any other process capable of forming an interference fit between axial tube 102 and inner barrier shell 105. An expandable process refers to a process by which inner barrier shell 105 is formed by expanding inner barrier layer 104. Inner barrier shell 105 may be formed by, for example, hydraulically expanding, pneumatically expanding, mechanically expanding, or any other desired expandable technology. In other embodiments, inner barrier shell may be formed from an electro-plating technology. In that embodiment, inner barrier shell 105 may be constructed without forming inner barrier layer 104.

In this particular embodiment, inner barrier shell 105 is formed by mechanically expanding inner barrier layer 104 using a mini-expandable pig. As used throughout this document the term "pig" refers to a mechanical device where at least a portion of the device has an outer diameter that is capable of increasing the diameter of a cylindrical device. That is, at least a portion of the pig has an outer diameter that is greater than an inner diameter of a device that is being expanded. Moreover, a pig comprises a material that is harder than a material associated with the cylindrical device being expanded. For example, where the cylindrical device being expanded comprises a gold material or a eutectic of gold, the pig comprises a material that is harder than gold.

In this example, the mini-expandable pig comprises a tungsten material where at least a portion of the pig has an outer diameter between 0.150" and 0.177". Although a tungsten pig having an outer diameter between 0.150" and 0.177" is used in this example, any other material and dimensions may be used without departing from the scope of the present disclosure. In this particular embodiment, the mini-expandable pig comprises a proximate end that has an outer diameter that is smaller than an outer diameter associated with a distal end. In some embodiments, the mini-expandable pig can have, for example, a bullet shape, a conical shape, or any other desired shape.

In various embodiments, the mini-expandable pig can be forced through an inner diameter of inner barrier layer 104 and along a length of layer 104 using, for example, a hydraulic force, a pneumatic force, or any other force capable of passing the pig through inner barrier layer 104. In one particular embodiment, the mini-expandable pig is forced through inner barrier layer 104 using a hydraulic force of approximately 1,500 to 4,000 pounds per square inch (psi). The force used to cause the mini-expandable pig to slide through and expand inner barrier layer 104 depends at least in part on the maximum outer diameter of the pig, the malleability of the material of inner barrier layer 104, and the hardness of material of the mini-expandable pig. Although a force of 1,500 to 4,000 psi was used in this example, any force, up to the burst pressure of axial tube 102, may be used without departing from the scope of the present disclosure. In this particular embodiment, forcing the mini-expandable pig through inner barrier layer 104 advantageously cold rolls overlap 106 and can result in the formation of a relatively gas tight pressure boundary without a welding process.

In this particular example, inner barrier shell 105 comprises a post-expansion thickness of at least one-thousandth of an inch ($t \geq 0.001"$ or 1 mil). In some embodiments, inner barrier shell 105 can comprise a post-formation thickness that is capable of withstanding scratches and other surface blemishes without significantly affecting the ability of inner barrier shell 105 to reduce and/or delay hydrogen and/or radiation permeation through conduit 100. In some cases, inner barrier shell 105 can comprise a post-formation thickness of, for example, at least sixteen microns, at least one-thousandth of an inch, at least five-thousandths of an inch, at least twelve-thousandths of an inch, at least twenty thousandths of an inch, at least fifty thousandths of an inch, or any other selected thickness. In other embodiments, inner barrier shell 105 can comprise a post-formation thickness that is capable of surviving diffusion between inner barrier shell 105 and axial tube 102 without significantly affecting the ability of inner barrier shell 105 to reduce and/or delay hydrogen and/or radiation permeation through conduit 100.

Although this example shows axial tube 102 and inner barrier shell 105 as being formed without interstitial layers between them, such interstitial layers could alternatively be formed without departing from the scope of the present disclosure. In an alternative embodiment, an insulating layer can be formed between axial tube 102 and inner barrier shell 105. In that embodiment, the insulating layer may comprise, for example, a Polyimide material, a TEFLON PFA material, or a combination of these or other insulating materials.

FIG. 1C shows a cross-sectional view of a fiber optic conduit 100 after formation an encapsulation layer 108 outwardly from axial tube 102. Depending on the desired operating parameters for fiber optic conduit 100, conduit 100 may be constructed without encapsulation layer 108. Forming encapsulation layer 108 may be effected through any of a variety of cable manufacturing techniques. Although this example shows axial tube 102 and encapsulation layer 108 as being formed without interstitial layers, such interstitial layers could alternatively be formed without departing from the scope of the present disclosure.

In this particular embodiment, encapsulation layer 108 operates to protect the materials of fiber optic conduit 100 during handling and installation. Encapsulation layer 108 can comprise, for example, Ethylene-chlorotrifluoroethylene (ECTFE), Fluoroethylene-propylene (FEP), Polyvinylidene fluoride (PVDF), Poly-vinylchloride (PVC), HALAR, TEFLON PFA, poly ether ether keytone (PEEK), or any other suitable material. In one particular embodiment, encapsulation layer 108 comprises an 11 mm by 11 mm Santoprene layer. Although this example includes an 11 mm by 11 mm encapsulation layer, any other combination of size and temperature rating can be used without departing from the scope of the present disclosure.

Figure 2A:
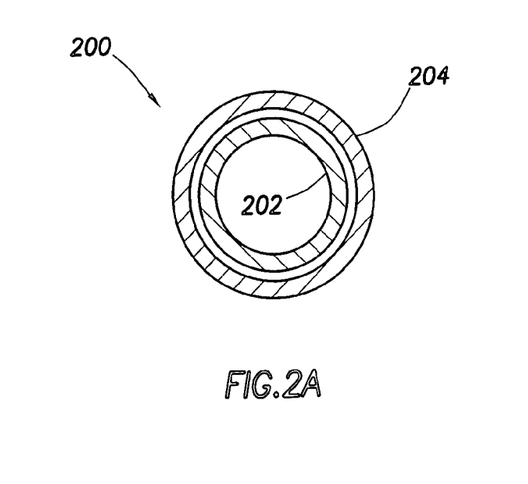
FIGS. 2A through 2C are cross-sectional views showing another example of a method of forming one embodiment of a hydrogen and/or radiation hindering fiber optic conduit for use in a hostile environment.
Figure 2B:
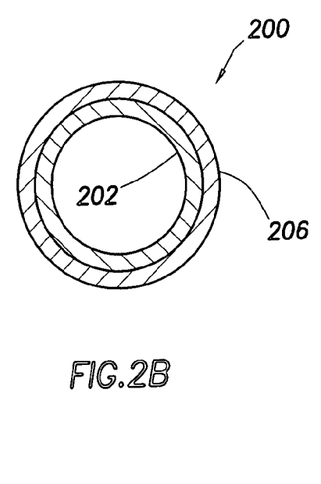
Figure 2C:
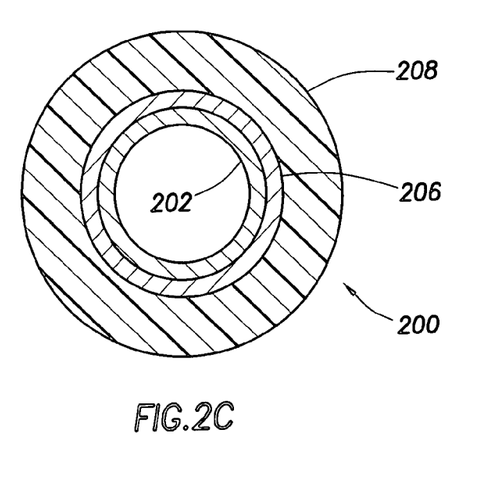

FIGS. 2A through 2C are cross-sectional views showing one example of a method of forming one embodiment of a hydrogen and/or radiation hindering fiber optic conduit 200 for use in a hostile environment. FIG. 2A shows a cross-sectional view of a fiber optic conduit 200 after formation of an axial tube 202 and an outer barrier layer 204 outwardly from axial tube 202. In this particular embodiment, axial tube 202 operates as a hydrostatic pressure boundary for fiber optic conduit 200. That is, axial tube 202 is capable of withstanding relatively high differential pressures between an environment within axial tube 202 and an environment external to axial tube 202.

Axial tube 202 may comprise, for example, Stainless Steel, Inconel, Incoloy, or any other corrosion resistant metal alloy. In this particular example, axial tube 202 comprises an Inconel A825 tube having a ¼-inch diameter and a 0.035-inch wall thickness. Although this example includes a diameter of ¼-inch and a wall thickness of 0.035-inches, any other selected diameter and wall thickness may be used without departing from the scope of the present disclosure. Moreover, the selected diameter and wall thickness of axial tube 202 may vary over the length of fiber optic conduit 200 depending upon the material selected. In other embodiments, axial tube 202 can comprise a high strength and/or high temperature polymer, such as, for example, a carbon based polymer, a polyimide, or other suitable epoxy or polymer.

Forming axial tube 202 may be effected through any of a variety of manufacturing techniques. In some embodiments, axial tube 202 may be formed by cold rolling a coiled strip stock of a desired material until the ends of the strip stock approximately abut. In that embodiment, the ends of the strip stock can be mechanically joined by, for example, plasma welding, laser welding, or any other appropriate mechanical or chemical joining technique.

Outer barrier layer 204 can comprise any material or combination of materials capable of reducing hydrogen and/or radiation permeation through fiber optic conduit 200. For example, outer barrier layer 204 can comprise carbon, silicon, germanium, tin, lead, lead hydride, gold, a eutectic of these materials, or a combination of these or other materials. In some cases, the material for outer barrier layer 204 can be selected based at least in part on a desired operating temperature or property. For example, if conduit 200 is to be used in a hostile environment having an operating temperature of approximately 300° C., then the material for outer barrier layer 204 should be selected such that its melting point is above at least 300° C. In that example, the material for outer barrier layer 204 could comprise, for example, gold, a eutectic of gold, antimony, palladium, silicon oxy-nitride, or any other material capable of reducing hydrogen and/or radiation permeation through fiber optic conduit 200 and capable of withstanding an operating temperature of at least 300° C.

In this particular embodiment, outer barrier layer 204 comprises a malleable material having a thickness that is capable of reducing and/or delaying hydrogen permeation through conduit 200. In some cases, outer barrier layer 204 may also be capable of reducing and/or delaying radiation permeation through conduit 200. In various embodiments, outer barrier layer 204 can comprise a malleable material having a thickness that is capable of withstanding scratches and other surface blemishes without significantly affecting the ability of outer barrier layer 204 to reduce and/or delay hydrogen and/or radiation permeation through conduit 200. In other embodiments, outer barrier layer 204 can comprise a thickness that is capable of surviving diffusion of particles between layer 204 and axial tube 202 without significantly affecting the ability of outer barrier layer 204 to reduce and/or delay hydrogen and/or radiation permeation through conduit 200. In some cases, outer barrier layer 204 can comprise a thickness of, for example, at least sixteen microns, at least one-thousandth of an inch, at least five-thousandths of an inch, at least ten thousandths of an inch, at least twenty thousandths of an inch, at least fifty thousandths of an inch, or any other selected thickness.

Forming outer barrier layer 204 may be effected through any of a variety of manufacturing techniques. In this particular embodiment, outer barrier layer 204 is formed by cold rolling a coiled strip stock of gold until the ends of the strip stock approximately abut. In that embodiment, the ends of the strip stock can be mechanically joined by, for example, plasma welding, laser welding, or any other appropriate mechanical or chemical joining technique. Although outer barrier layer 204 is formed by cold rolling and mechanically joining the ends in this example, any other technique for forming an outer barrier layer may be employed without departing from the scope of the present disclosure.

In an alternative embodiment, outer barrier layer 204 can be formed by wrapping a helical metallic tape of a desired material around axial tube 202. In that embodiment, the helical metallic tape can be wrapped such that it overlaps another portion of the helical tape. The overlap may comprise, for example, approximately one-quarter of an inch (¼") per turn, one-half of an inch (½") per turn, or any other desired overlap. In some embodiments; the helical tape can be mechanically joined by, for example, a helical seal weld.

In various embodiments, outer barrier layer 204 and axial tube 202 can be formed approximately simultaneously. That is, portions of axial tube 202 can be cold rolled and mechanically joined just before portions outer barrier layer 204 are cold rolled and mechanically joined. In other embodiments, outer barrier layer 204 and axial tube 202 can be formed substantially independently of one another. In those cases, after formation of outer barrier layer 204 and axial tube 202, axial tube 202 can be inserted into outer barrier layer 204. In this particular embodiment, at least a portion of axial tube 202 is cold rolled and mechanically joined before the portion of outer barrier layer 204 that covers that portion of axial tube 202 is cold rolled and mechanically joined.

FIG. 2B shows a cross-sectional view of a fiber optic conduit 200 after formation of an outer barrier shell 206 outwardly from axial tube 202. In this particular embodiment, outer barrier shell 206 operates to reduce and/or delay hydrogen permeation through fiber optic conduit 200. In other embodiments, outer barrier shell 206 may be capable of reducing and/or delaying radiation permeation through conduit 200. In this particular embodiment, outer barrier shell 206 forms a cylindrical covering substantially about an outer surface of axial tube 202.

In this particular embodiment, outer barrier shell 206 resides outwardly from and in contact with axial tube 202. That is, at least a portion of an inner surface of outer barrier shell 206 contacts at least a portion of an outer surface of axial tube 202. In this example, the portion of outer barrier shell 206 in contact with axial tube 202 adheres to axial tube 202 through an interference fit.

Forming outer barrier shell 206 may be effected through any of a variety of manufacturing processes. In various embodiments, outer barrier shell 206 may be formed, for example, by compression rolling, swaging, hydro-forming, or any other process capable of forming an interference fit between axial tube 202 and outer barrier shell 206. In other embodiments, inner barrier shell may be formed from an electro-plating technology. In those embodiments, outer barrier shell 206 may be constructed without forming outer barrier layer 204.

In one particular embodiment, outer barrier shell 206 is formed by forcing the combination of outer barrier layer 204 and axial tube 202 through a swage die or a conical shaped orifice having an outer diameter that is smaller than an outer diameter of outer barrier layer 204. In one particular embodiment, the combination of outer barrier layer 204 and axial tube 202 is forced through a conical shaped orifice using a force of approximately 1,500 to 4,000 pounds per square inch (psi). The force used to compress or swage outer barrier layer 204 onto axial tube 202 depends at least in part on the minimum outer diameter of the conical orifice, the malleability of the material of outer barrier layer 204, and the hardness of material of the orifice. Although a force of 1,500 to 4,000 psi was used in this example, any force, up to the crush pressure of axial tube 202, may be used without departing from the scope of the present disclosure.

In this particular example, outer barrier shell 206 comprises a post-compression thickness of at least one-thousandth of an inch (t≧0.001" or 1 mil). In some embodiments, outer barrier shell 206 can comprise a post-formation thickness that is capable of withstanding scratches and other surface blemishes without significantly affecting the ability of outer barrier shell 206 to reduce and/or delay hydrogen and/or radiation permeation through conduit 200. In some cases, outer barrier shell 206 can comprise a post-formation thickness of, for example, at least sixteen microns, at least one-thousandth of an inch, at least five-thousandths of an inch, at least twelve-thousandths of an inch, at least twenty thousandths of an inch, at least fifty thousandths of an inch, or any other selected thickness. In other embodiments, outer barrier shell 206 can comprise a post-formation thickness that is capable of surviving diffusion between outer barrier shell 206 and axial tube 202 without significantly affecting the ability of outer barrier shell 206 to reduce and/or delay hydrogen and/or radiation permeation through conduit 200.

Although this example shows axial tube 202 and outer barrier shell 206 as being formed without interstitial layers between them, such interstitial layers could alternatively be formed without departing from the scope of the present disclosure. In an alternative embodiment, an insulating layer can be formed between axial tube 202 and outer barrier shell 206. In that embodiment, the insulating layer may comprise, for example, a Polyimide material, a TEFLON PFA material, or a combination of these or other insulating materials.

FIG. 2C shows a cross-sectional view of a fiber optic conduit 200 after formation an encapsulation layer 208 outwardly from outer barrier shell 206. Depending on the desired operating parameters for fiber optic conduit 200, conduit 200 may be constructed without encapsulation layer 208. Forming encapsulation layer 208 may be effected through any of a variety of standard cable manufacturing techniques. Although this example shows outer barrier shell 206 and encapsulation layer 208 as being formed without interstitial layers, such interstitial layers could alternatively be formed without departing from the scope of the present disclosure.

In this particular embodiment, encapsulation layer 208 operates to protect the materials of fiber optic conduit 200 during handling and installation. Encapsulation layer 208 can comprise, for example, Ethylene-chlorotrifluoroethylene (ECTFE), Fluoroethylene-propylene (FEP), Polyvinylidene fluoride (PVDF), Poly-vinylchloride (PVC), HALAR, TEFLON PFA, poly ether ether keytone (PEEK), or any other suitable material. In various embodiments, encapsulation layer 208 may comprise an 11 mm by 11 mm Santoprene layer. Although this example includes an 11 mm by 11 mm encapsulation layer, any other combination of size and temperature rating can be used without departing from the scope of the present disclosure.

Figure 3A:
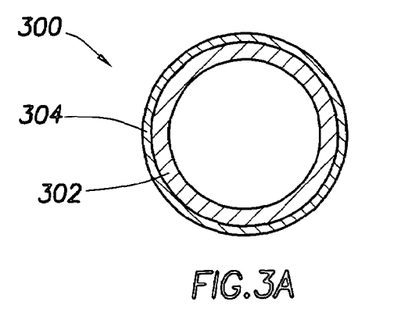
FIGS. 3A through 3C are cross-sectional views showing one example of a method of forming one embodiment of a hydrogen and/or radiation hindering fiber optic conduit for use in a hostile environment.
Figure 3B:
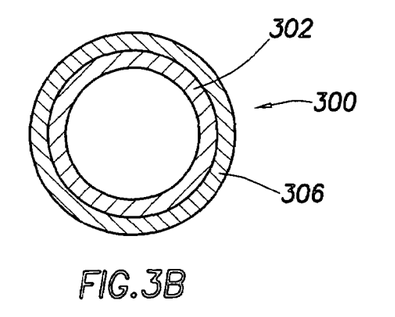
Figure 3C:
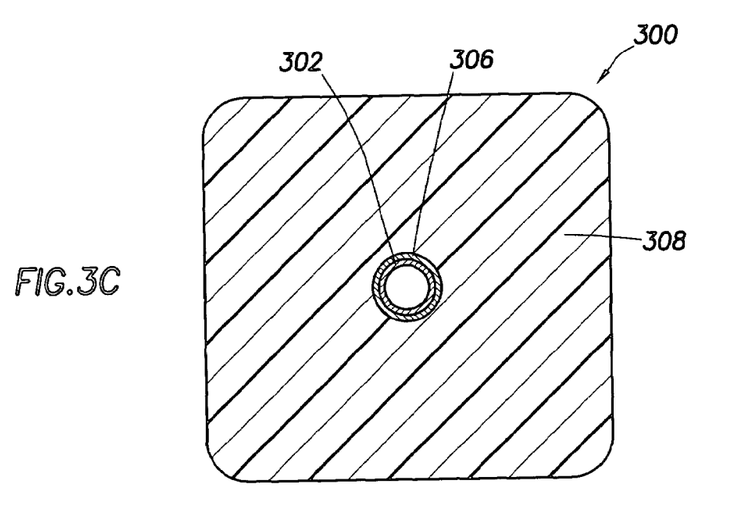

FIGS. 3A through 3C are cross-sectional views showing one example of a method of forming one embodiment of a hydrogen and/or radiation hindering fiber optic conduit 300 for use in a hostile environment. FIG. 3A shows a cross-sectional view of a fiber optic conduit 300 after formation of an axial tube 302 and a conductive layer 304 outwardly from axial tube 302. In this particular embodiment, axial tube 302 operates as a hydrostatic pressure boundary for fiber optic conduit 300. That is, axial tube 302 is capable of withstanding relatively high differential pressures between an environment within axial tube 302 and an environment external to axial tube 302.

Axial tube 302 may comprise, for example, Stainless Steel, Inconel, Incoloy, or any other corrosion resistant metal alloy. In this particular example, axial tube 302 comprises an Inconel A825 tube having a ¼-inch diameter and a 0.035-inch wall thickness. Although this example includes a diameter of ¼-inch and a wall thickness of 0.035-inches, any other selected diameter and wall thickness may be used without departing from the scope of the present disclosure. Moreover, the selected diameter and wall thickness of axial tube 302 may vary over the length of fiber optic conduit 300 depending upon the material selected. In other embodiments, axial tube 302 can comprise a high strength and/or high temperature polymer, such as, for example, a carbon based polymer, a polyimide, or other suitable epoxy or polymer.

Forming axial tube 302 may be effected through any of a variety of manufacturing techniques. In some embodiments, axial tube 302 may be formed by cold rolling a coiled strip stock of a desired material until the ends of the strip stock approximately abut. In that embodiment, the ends of the strip stock can be mechanically joined by, for example, plasma welding, laser welding, or any other appropriate mechanical or chemical joining technique.

Forming conductive layer 304 may be effected through any of a variety of standard techniques associated with cable manufacturing. Conductive layer 304 can comprise any conductive material, such as, for example, copper, gold, silver, or a combination of these or other metallic or non-metallic materials. In some embodiments, conductive layer can comprise, for example, a braided, straight, or helically laid conductor. In this particular embodiment, conductive layer 304 comprises a wickable conductor such as, for example, a braided conductor, a helically laid conductor, or any other wickable conductive layer. As used throughout this document, the phrase "wickable conductor" refers to a conductor that is capable of conveying molten material by capillary, adhesive, or wicking action. In this particular example, conductive layer 304 comprises a pre-tinned copper braid. Using a pre-tinned conductive layer 304 can advantageously assist in the integration of a molten bath material into conductive layer 304 by a wicking action.

In this particular embodiment, conductive layer 304 resides outwardly from and in contact with axial tube 302. That is, at least a portion of an inner surface of conductive layer 304 contacts at least a portion of an outer surface of axial tube 302. Conductive layer 304 can comprise, for example, a thickness of at least sixteen microns, at least one-thousandth of an inch, at least five-thousandths of an inch, at least ten-thousandths of an inch, or any other selected thickness.

In this example, the portion of conductive layer 304 in contact with axial tube 302 adheres to axial tube 302 through an interference fit. That is, the points at which conductive layer 304 adhere to axial tube 302 are substantially free from ionic bonding, covalent bonding, epoxy bonding, brazing and/or welding. Although this example shows axial tube 302 and conductive layer 304 as being formed without interstitial layers between them, such interstitial layers could alternatively be formed without departing from the scope of the present disclosure. In an alternative embodiment, an insulating layer can be formed between axial tube 302 and conductive layer 304. In that embodiment, the insulating layer may comprise, for example, a Polyimide material, a TEFLON PFA material, or a combination of these or other insulating materials.

FIG. 3B shows a cross-sectional view of a fiber optic conduit 300 after formation of an outer barrier shell 306 outwardly from axial tube 302. In this particular embodiment, outer barrier shell 306 operates to reduce and/or delay hydrogen permeation through fiber optic conduit 300. In other embodiments, outer barrier shell 306 may be capable of reducing and/or delaying radiation permeation through conduit 300. In this particular embodiment, outer barrier shell 306 forms a cylindrical covering substantially about an outer surface of axial tube 302.

In this particular embodiment, outer barrier shell 306 resides outwardly from and in contact with axial tube 302. That is, at least a portion of an inner surface of outer barrier shell 306 contacts at least a portion of an outer surface of axial tube 302. In this example, the portion of outer barrier shell 306 in contact with axial tube 302 adheres to axial tube 302 through an interference fit.

Outer barrier shell 306 can comprise any material or combination of materials capable of reducing hydrogen permeation through fiber optic conduit 300. For example, outer barrier shell 306 can comprise carbon, silicon, germanium, tin, lead, gold, or a combination of these or other materials. In this example, outer barrier shell 306 comprises a thickness capable of withstanding scratches and other surface blemishes without significantly affecting the ability of outer barrier shell 306 to reduce and/or delay hydrogen permeation through conduit 300.

Forming outer barrier shell 306 may be effected through any of a variety of manufacturing processes. In one particular embodiment, outer barrier shell 306 is formed by passing conductive layer 304 through a molten bath comprising a material or combination of materials capable of reducing and/or delaying hydrogen permeation through fiber optic conduit 300. In some cases, the molten bath material may also be capable of reducing and/or delaying radiation permeation through fiber optic conduit 300. The material of the molten bath can comprise, for example, carbon, silicon, germanium, tin, lead, gold, or a combination of these or other elements. In this particular embodiment, the material of the molten bath comprises tin. In that embodiment, conductive layer 304 operates to integrate the tin material of the molten bath into conductive layer 304 by a wicking action to form outer barrier shell 306. In this particular embodiment, the temperature of the tin material of the molten bath comprises approximately 240° C. Although the temperature of the molten bath material is 240° C. in this example, any other temperature can be used without departing from the scope of the present disclosure.

Cable manufacturers can adjust various process parameters to achieve a desired thickness and/or hydrogen or radiation permeation rate for outer barrier shell 306. For example, cable manufacturers can adjust the temperature of the material of the molten bath, the amount of time that conductive layer 304 remains in the molten bath, and the length of the molten bath to achieve the desired results. In various embodiments, the temperature of the material of the molten bath can be manipulated by combining the desired material with eutectics of that material. For example, if the material of the molten bath comprises lead, then a cable manufacturer could add tin to the molten bath to manipulate the melting point of lead.

In addition, cable manufacturers can adjust the rate at which conductive layer 304 passes through the molten bath. In most cases, the rate at which conductive layer 304 passes through the molten bath is based at least in part on the temperature associated with the material of the molten bath. That is, the higher the temperature of the material of the molten bath, the higher the rate at which conductive layer 304 passes through the molten bath. Moreover, the rate at which conductive layer 304 passes through the molten bath is based at least in part on the material selected for conductive layer 304, the thickness of conductive layer 304, the type of conductor selected for conductive layer 304, and the rate at which the molten material integrates into or through conductive layer 304.

In various embodiments, conductive layer 304 passes through the molten bath at a rate sufficient to ensure that the molten material is sufficiently integrated through the thickness of conductive layer 304 by a wicking action. In other words, each portion of conductive layer 304 remains in the molten bath for a period of time that ensures that the molten material is sufficiently conveyed through the thickness of conductive layer 304. In some cases, each portion of conductive layer 304 remains in the molten bath for, for example, for at least one-hundred milli-seconds, for at least ½-second, for at least one-second, or any other desired length of time. The period of time that each portion of conductive layer 304 can remain in the molten bath depends at least in part on the temperature of the molten material, material selected for the molten material, the thickness of conductive layer 304, the material selected for conductive layer 304, the type of conductive layer selected for conductive layer 304, and the temperature ratings of the materials associated with axial tube 302 and conductive layer 304.

In some embodiments, the manufacturing process associated with forming outer barrier shell 306 can implement a 2:1 ratio between a desired rate of travel and the length of the molten bath. That is, if the desired rate of travel through the molten bath is three-feet per second and, to achieve the desired thickness of outer barrier shell 306, each portion of conductive layer 304 remains in the molten bath for ½-second, then the length of the molten bath is selected to be one and one-half feet. In most cases, the 2:1 ratio can achieve the desired thickness of outer barrier shell 306 and can ensure that the molten material is sufficiently conveyed through the thickness of conductive layer 304. Although this example implements a 2:1 ratio, any other selected ratio can be used without departing from the scope of the present disclosure.

In this particular example, outer barrier shell 306 comprises a post-formation thickness of at least one-thousandth of an inch ($t \geq 0.0011"$ or 1 mil). In some embodiments, outer barrier shell 306 can comprise a post-formation thickness that is capable of withstanding scratches and other surface blemishes without significantly affecting the ability of outer barrier shell 306 to reduce and/or delay hydrogen and/or radiation permeation through conduit 300. In some cases, outer barrier shell 306 can comprise a post-formation thickness of, for example, at least sixteen microns, at least one-thousandth of an inch, at least five-thousandths of an inch, at least twelve-thousandths of an inch, at least twenty thousandths of an inch, at least fifty thousandths of an inch, or any other selected thickness. In other embodiments, outer barrier shell 306 can comprise a post-formation thickness that is capable of surviving diffusion between outer barrier shell 306 and axial tube 302 without significantly affecting the ability of outer barrier shell 306 to reduce and/or delay hydrogen and/or radiation permeation through conduit 300.

In an alternative embodiment, before passing conductive layer 304 through the molten bath to form outer barrier shell 306, conductive layer 304 can pass through an oxide cleaner to remove any oxides associated with conductive layer 304. In various embodiments, the oxide cleaner may comprise, for example, an acid flux cleaner, a terpene flux cleaner, an environmentally safe flux cleaner, or any other suitable flux cleaner.

In this particular embodiment, outer barrier shell 306 is formed by passing conductive layer 304 through a molten bath. In an alternative embodiment, outer barrier shell can be formed by wrapping or surrounding conductive layer 304 with a metal tape or solder. The metal tape or solder can comprise a desired thickness of a desired material. The material of the metal tape or solder can comprise, for example, carbon, silicon, germanium, tin, lead, gold, or a combination of these or other elements. In that embodiment, after wrapping or surrounding conductive layer 304 with a metal tape or solder, the combination of the wrapped conductive layer 304 can be heated to the melting point of the material of the metal tape or solder. Heating the metal tape or solder to its melting point will result in the integration of the material of the metal tape or solder into conductive layer 304 by a wicking action.

FIG. 3C shows a cross-sectional view of a fiber optic conduit 300 after formation an encapsulation layer 308 outwardly from outer barrier shell 306. Depending on the desired operating parameters for fiber optic conduit 300, conduit 300 may be constructed without encapsulation layer 308. Forming encapsulation layer 308 may be effected through any of a variety of standard cable manufacturing techniques. Although this example shows outer barrier shell 306 and encapsulation layer 308 as being formed without interstitial layers, such interstitial layers could alternatively be formed without departing from the scope of the present disclosure.

In this particular embodiment, encapsulation layer 308 operates to protect the materials of fiber optic conduit 300 during handling and installation. Encapsulation layer 308 can comprise, for example, Ethylene-chlorotrifluoroethylene (ECTFE), Fluoroethylene-propylene (FEP), Polyvinylidene fluoride (PVDF), Poly-vinylchloride (PVC), HALAR, TEFLON PFA, poly ether ether keytone (PEEK), or any other suitable material. In various embodiments, encapsulation layer 308 may comprise an 11 mm by 11 mm Santoprene layer. Although this example includes an 11 mm by 11 mm encapsulation layer, any other combination of size and temperature rating can be used without departing from the scope of the present disclosure.

In various embodiments, one or more optical fibers can be installed within, for example, fiber optic conduits 100, 200, and 300 of FIGS. 1, 2, and 3, respectively. The one or more optical fibers can comprise, for example, a single mode optical fiber, a multi-mode optical fiber, or a combination of these of other fiber types. In some embodiments, the one or more optical fibers may be installed, for example, after the conduit is installed within a well-bore, before the conduit is installed within a well-bore, or at any other appropriate time.

The one or more optical fibers can be installed within conduits 100, 200, and 300 using any of a variety of techniques. For example, the one or more optical fibers could be pumped into conduits 100, 200, and 300. In those embodiments, the optical fibers can be used as a distributed sensor within the hostile environment. That is, one or more optical fibers within optical conduits 100, 200, and 300 may be capable of, for example, sensing a temperature profile, a strain profile, or a combination of these or other parameters. In other embodiments, the one or more optical fibers within fiber optic conduits 100, 200, and 300 can be used to communicate data from sensors within a hostile environment to instrumentation outside the environment.

In some embodiments, one or more hydrogen scavenging materials can be installed within, for example, fiber optic conduits 100, 200, and 300. The hydrogen scavenging materials can comprise, for example, a hydrogen scavenging gel or other hydrogen scavenging material that adheres to the one or more optical fibers installed within the fiber optic conduits. Using a hydrogen scavenging material within the fiber optic conduit allows the fiber optic conduit to alleviate hydrogen degradation of the one or more optical fibers for hydrogen generated within the conduit.

In one particular embodiment, the one or more fiber optic cables within fiber optic conduits 100, 200, and 300 can facilitate the communication of data from sensors within a down-hole oil or gas well to instrumentation outside the down-hole well. In that embodiment, the down-hole oil or gas well environment typically includes the presence of hydrogen, relatively high temperatures, and/or corrosive chemistries. In most cases, the relatively high temperature of the down-hole environment can be, for example, at least 30° C., at least 100° C., at least 150° C., or more. In other embodiments, the down-hole oil or gas well environment may also include one or more radiation sources, such as, a pulse neutron generator, a gamma ray tool, a line of radioactive markers that are co-axial with or co-propagating with the optical fiber, or a combination of these or other radiation sources. In some embodiments, fiber optic conduits 100, 200, and 300 are capable of being used in a sub-sea environment that includes the presence of hydrogen.

One aspect of this disclosure recognizes that forming a barrier shell within and/or around a fiber optic conduit can alleviate some of the problems conventionally associated with the use of optical fibers in hostile environments. In particular, forming a barrier shell within and/or around a fiber optic conduit can minimize and/or delay the deleterious effects of hydrogen on the optical fibers used in hostile environments, such as those found in the down-hole oil or gas well industry and/or the under-sea telecommunications industry. Moreover, forming a barrier shell within and/or around a fiber optical conduit can minimize and/or delay the deleterious effects of ionizing radiation on the optical fibers used in the hostile environments.

Figure 4:
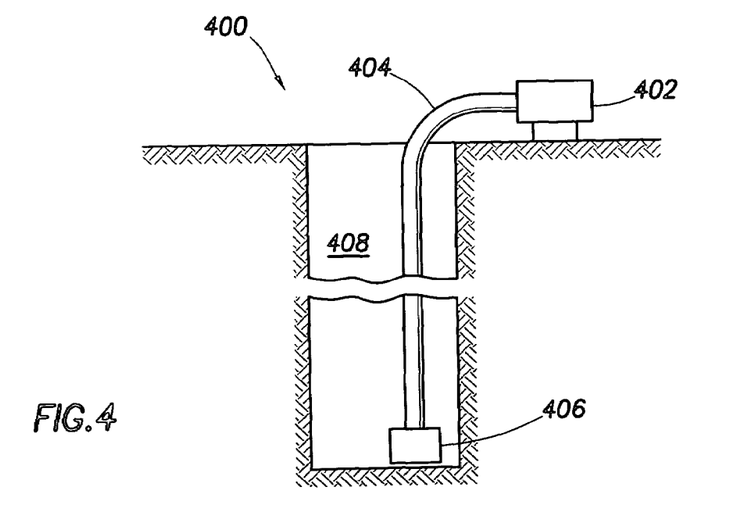
FIG. 4 is a block diagram illustrating a control system implementing a hydrogen and/or radiation hindering fiber optic conduit and one or more optical fibers in a down-hole environment.

In various embodiments, one or more optical fibers installed within fiber optic conduits 100, 200, and 300 are capable of providing reliable transmission of optical signals between one or more sensors within a hostile environment and instrumentation outside the hostile environment. FIG. 4 illustrates one particular implementation of fiber optic conduits 100, 200, and 300 after one or more optical fibers have been installed.

FIG. 4 is a block diagram illustrating a control system 400 implementing a hydrogen and/or radiation hindering fiber optic conduit 404 in a down-hole environment 408. In this example, control system 400 includes a controller 402 that is capable of monitoring one or more parameters associated with down-hole environment 408. Controller 402 can comprise, for example, any combination of hardware, software, and/or firmware that is capable of performing a desired functionality.

In various embodiments, one or more optical fibers are installed within fiber optic conduit 404. The structure and function of conduit 404 can be substantially similar to the structure and function of conduits 100, 200, and 300 of FIGS. 1, 2, and 3, respectively. The one or more optical fibers within fiber optic conduit 404 may transmit optical signals between sensors 406 and controller 402. In other embodiments, the one or more of optical fibers can comprise a distributed sensor that is capable of monitoring, for example, a temperature profile of down-hole environment 408, a strain, or a combination of these or other parameters. In this particular embodiment, down-hole environment 408 includes the presence of hydrogen and a relatively high temperature. In some cases, the relatively high temperatures in the down-hole well can exceed approximately 100° C.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A fiber optic conduit for use in a hostile environment, comprising:
an axial tube comprising a corrosion resistant material and operable to receive one or more optical fibers; and
a hydrogen barrier shell disposed in contact with the axial tube, the hydrogen barrier shell comprising a material capable of reducing hydrogen permeation through the fiber optic conduit and a thickness of at least approximately one-thousandth of an inch.

2. The fiber optic conduit of claim 1, wherein the axial tube operates as a hydrostatic pressure boundary for fiber optic conduit.

3. The fiber optic conduit of claim 1, wherein the hydrogen barrier shell adheres to the axial tube through an interference fit.

4. The fiber optic conduit of claim 1, wherein the hydrogen barrier shell is capable of reducing ionizing radiation flux intensity through the fiber optic conduit.

5. The fiber optic conduit of claim 1, wherein the material capable of reducing hydrogen permeation through the fiber optic conduit is selected from the group consisting of carbon, silicon, germanium, tin, lead, and gold.

6. The fiber optic conduit of claim 1, wherein the hydrogen barrier shell forms a cylindrical covering substantially about the axial tube.

7. The fiber optic conduit of claim 6, wherein the hydrogen barrier shell forms a cylindrical covering substantially about an inner surface of the axial tube.

8. The fiber optic conduit of claim 6, wherein the hydrogen barrier shell forms a cylindrical covering substantially about an outer surface of the axial tube.

9. The fiber optic conduit of claim 1, wherein the hydrogen barrier shell is substantially free from relying on the axial tube for mechanical integrity.

10. A method of forming a fiber optic conduit capable of being used in a hostile environment, the method comprising:
    forming an axial tube a corrosion resistant material and operable to receive one or more optical fibers;
    forming a barrier layer comprising a material capable of reducing hydrogen permeation through the fiber optic conduit; and
    after forming the barrier layer, forming a hydrogen barrier shell disposed in contact with the axial tube, wherein forming a hydrogen barrier shell comprises forming an interference fit between the barrier layer and the axial tube.

11. The method of claim 10, wherein forming an interference fit between the barrier layer and the axial tube comprises expanding the barrier layer using a mini-expandable pig.

12. The method of claim 10, wherein forming an interference fit between the barrier layer and the axial tube comprises passing the combination of the axial tube and the barrier layer through a swage die.

13. The method of claim 10, wherein the hydrogen barrier shell is substantially free from relying on the inner axial tube for mechanical integrity.

14. The method of claim 10, wherein the hydrogen barrier shell comprises a thickness at least approximately one-thousandth of an inch.

15. A fiber optic conduit for use in a hostile environment, comprising:
    an axial tube comprising a corrosion resistant material and capable of receiving one or more optical fibers; and
    a hydrogen barrier shell comprising a material capable of reducing hydrogen permeation through the fiber optic conduit and operable to form a cylindrical covering substantially about a surface of the axial tube,
    wherein at least a portion of the hydrogen barrier shell is in contact with and adheres to at least a portion of the axial tube through an interference fit, and
    wherein the hydrogen barrier shell is substantially free from relying on the axial tube for mechanical integrity.

16. The fiber optic conduit of claim 15, wherein the hydrogen barrier shell forms a cylindrical covering substantially about an inner surface of the axial tube.

17. The fiber optic conduit of claim 15, wherein the hydrogen barrier shell forms a cylindrical covering substantially about an outer surface of the axial tube.

18. The fiber optic conduit of claim 15, wherein the hydrogen barrier shell is capable of reducing radiation permeation through the fiber optic conduit.

19. The fiber optic conduit of claim 15, wherein the thickness of the hydrogen barrier shell comprises at least approximately one-thousandth of an inch.

* * * * *